United States Patent
Muench

(10) Patent No.: US 10,433,325 B2
(45) Date of Patent: Oct. 1, 2019

(54) METHOD FOR SCHEDULING A TRANSMISSION OF PACKETS WITHIN A NETWORK

(71) Applicant: ADVA Optical Networking SE, Meiningen (DE)

(72) Inventor: Daniel Muench, Munich (DE)

(73) Assignee: ADVA OPTICAL NETWORKING SE, Meiningen OT Dreissigacker (DE)

(*) Notice: Subject to any disclaimer, the term of this patent is extended or adjusted under 35 U.S.C. 154(b) by 9 days.

(21) Appl. No.: 15/691,261

(22) Filed: Aug. 30, 2017

(65) Prior Publication Data

US 2018/0070373 A1 Mar. 8, 2018

(30) Foreign Application Priority Data

Sep. 8, 2016 (EP) .................................... 16187925

(51) Int. Cl.
| | |
|---|---|
| *H04L 1/00* | (2006.01) |
| *H04W 72/12* | (2009.01) |
| *H04L 7/00* | (2006.01) |
| *H04L 12/801* | (2013.01) |
| *H04W 28/02* | (2009.01) |
| *H04W 56/00* | (2009.01) |
| *H04L 29/08* | (2006.01) |
| *H04W 88/08* | (2009.01) |

(52) U.S. Cl.
CPC ....... *H04W 72/1252* (2013.01); *H04L 7/0033* (2013.01); *H04L 47/14* (2013.01); *H04W 28/0289* (2013.01); *H04W 56/001* (2013.01); *H04W 72/1278* (2013.01); *H04L 69/323* (2013.01); *H04L 69/324* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 2004/0047293 | A1* | 3/2004 | Arrakoski ............. | H04L 12/417 370/236 |
| 2011/0271163 | A1* | 11/2011 | Le Floch ............ | H03M 13/353 714/752 |
| 2012/0008646 | A1* | 1/2012 | Fourcand .............. | H04J 3/0667 370/514 |
| 2013/0223458 | A1* | 8/2013 | Bui ....................... | H04J 3/0667 370/503 |
| 2014/0029434 | A1* | 1/2014 | Wang ................ | H04W 52/0219 370/236 |

(Continued)

OTHER PUBLICATIONS

Wan Tao et al.: "A Performance Study of CPRI over Ethernet with IEEE 802.1Qbu and 802.1Qbv Enhancements," *2015 IEEE Global Communications Conference*, IEEE, Dec. 6, 2015, pp. 1-6.

(Continued)

*Primary Examiner* — Phirin Sam
(74) *Attorney, Agent, or Firm* — Jenkins, Wilson, Taylor & Hunt, P.A.

(57) ABSTRACT

A method for scheduling a transmission of packets within a network using a common periodic time window, having a congestion protected section, partitioned into time slots, including time slots dedicated to packets being sensitive to a delay variation.

21 Claims, 7 Drawing Sheets

(56) References Cited

U.S. PATENT DOCUMENTS

| | | | |
|---|---|---|---|
| 2014/0079030 A1* | 3/2014 | Van Parys | H04W 28/10 370/336 |
| 2016/0112969 A1* | 4/2016 | Zhou | H04W 24/08 370/252 |
| 2016/0212042 A1* | 7/2016 | Kwon | H04L 69/04 |
| 2017/0188406 A1* | 6/2017 | Baligh | H04W 40/02 |
| 2018/0006931 A1* | 1/2018 | Ellis | H04L 1/0018 |
| 2018/0034525 A1* | 2/2018 | Park | H04L 5/00 |
| 2018/0302807 A1* | 10/2018 | Chen | H04L 45/22 |

OTHER PUBLICATIONS

"IEEE Standard for Local and Metropolitan area networks—Bridges and Bridged Networks—Amendment 25: Enhancements for Scheduled Traffic; IEEE Std 802.1Qbv-2015 (Amendment to IEEE Std. 802.1Q—as amended by IEEE Std 802.1Qca-2015, IEEE Std 802.1Qcd-2015, and IEEE Std 802.1Q—Cor Jan. 2015)", *IEEE Standard*, IEEE, Piscataway, NJ, USA, Mar. 18, 2016, pp. 1-57.
Extended European Search Report for Application No. 16187925.9 dated Aug. 23, 2017.

\* cited by examiner

METHOD FOR SCHEDULING A TRANSMISSION OF PACKETS WITHIN A NETWORK

CROSS-REFERENCE TO RELATED APPLICATION

This application claims priority to European Patent Application EP 16 187 925.9 filed Sep. 8, 2016, the entire disclosure of which is incorporated by reference herein.

TECHNICAL FIELD

The disclosure herein relates to a method and a system for scheduling a transmission of packets within a network and in particular to a method and system for minimizing a delay variation for packet-based synchronization within a network.

BACKGROUND

Networks, in particular access networks of 5G mobile communication networks require stringent constraints for time and frequency. The integration of legacy compatibility to common public radio interface CPRI into Ethernet-based access networks is challenging and requires suitable scheduling mechanisms.

There are several different conventional approaches for mitigating packet delay variations within a network. A possible approach is to use boundary clocks to mitigate a packet delay variation caused by other interfering synchronization packets by partitioning a large network into network segments. Using transparent clocks mitigates variation induced by the residence time of a synchronization packet within a network bridge device by performing additional input and output timestamping. This conventional mechanism is also known as delay equalization. A disadvantage of the packet-based synchronization approaches like IEEE 1588 is that they are sensitive to packet delay variation and packet delay asymmetry caused by congestion or other reasons. For instance, the achievable precision for IEEE 1588v2 phase and time alignment is usually below 1 μs, if transparent clock mechanisms are applied. For instance, with Cisco Nexus 3000 switches a phase and time alignment below 500 ns can be reached. Further, IEEE 802.1AS can achieve an accuracy for phase and time synchronization below 500 ns.

Another conventional approach for mitigating packet delay variation is the application of available quality of service means. An example for such a quality of service means is the prioritizing of time synchronization packets and a combination of priority-based scheduling and frame pre-emption as specified by IEEE 802.1Q. Using solely priority-based scheduling can be sufficient to fulfil the requirements in some use cases. Using a combination of quality of service means like priority-based scheduling, frame pre-emption as well as using small packet sizes with not more than 300 Byte can achieve a delay variation of about 1.3 μs in smaller networks having for instance two to three hops and less than 20 network nodes. However, there are many real-word scenarios with bigger networks having a higher number of network nodes and comprising other topologies where the use of priority-based scheduling is not sufficient.

In a further possible conventional approach, the synchronization messages within the network are averaged. This means a mean value is calculated to balance packet delay variation of the synchronization packets. The averaging of synchronization messages or synchronization packages is implementable with limited effort; however, this conventional approach requires a high amount of samples to achieve low variation making this mechanism inefficient for larger networks.

A further conventional approach is the use of ranging mechanisms wherein algorithms are used to filter or select the synchronization packets which experience a minimum packet delay within an observed time window. However, this conventional mechanism works typically only for low data loads.

Another conventional approach is the calibration by external means like the Assisted Partial Timing Support APTS. The Assisted Partial Timing Support APTS uses an additional GPS (Global Positioning System) receiver at a remote radio head RRH or radio base station to perform compensation in a network where not all network elements or network nodes are time-synchronized. A pure GPS based compensation provides a typical accuracy of +−100 ns and in best cases +−50 ns. Assisted GPS can reach even higher precision. However, this approach has the significant disadvantage of being dependent on an existing GPS system.

Accordingly, there does not exist any packet-based solution for mitigating packet delay variation which can reach stringent timing requirements without drawbacks or limitations.

Accordingly, there is a need to provide a method for scheduling a transmission of packets within a network which allows to mitigate packet delay variation and which fulfils the stringent timing requirements of access networks, in particular access networks of 5G mobile communication networks.

SUMMARY

The disclosure herein provides according to the first aspect of the present disclosure a method for scheduling a transmission of packets within a network using a common periodic time window having a congestion protected section partitioned into time slots including time slots dedicated to packets being sensitive to a delay variation.

In a possible embodiment of the method according to the first aspect of the present disclosure, the congestion protected section is partitioned into time slots including for each node of the network downlink time slots and uplink time slots dedicated to packets being sensitive to a delay variation. A node is considered an active node in this context. If a node is not active, there is no requirement to assign time slots to the node. In both smaller and larger networks, slots do not have to be reserved for all nodes (or ports of the node) in the network; they need only be reserved if these nodes (or ports of the node) are active. In larger networks, time slots only have to be reserved for packets passing over this node (e.g. a switch).

The use of uplink and downlink time slots allows for a finer control and increases the efficiency and performance of the network.

In a further possible embodiment of the method according to the first aspect of the present disclosure, the congestion protected section of the common periodic time window comprises a congestion protected synchronization section partitioned for each node of the network into downlink and uplink time slots dedicated to transmit synchronization packets used for time and/or frequency synchronization of the network nodes of the network.

An advantage of this embodiment is that the synchronization packets do not suffer any congestions since the specific time slots are reserved and allocated for the synchronization packets. Since there is no congestion this avoids any packet delay variation caused by queuing within the network.

In a further possible embodiment of the method according to the first aspect of the present disclosure, the congestion protected section of the common periodic time window further comprises a congestion protected data section partitioned into time slots dedicated to other packets being less sensitive or insensitive to delay variation.

In a possible embodiment of the method according to the first aspect of the present disclosure, these other packets comprise data packets and/or control packets.

In a further possible embodiment of the method according to the first aspect of the present disclosure, the common periodic time window comprises the congestion protected section, an unpartitioned best effort section and an unpartitioned best effort guard section.

This embodiment combines the advantage of having a zero congestion and packet delay for synchronization packets with the increased efficiency of using priority-based packet transmission.

In a possible embodiment of the method according to the first aspect of the present disclosure, the unpartitioned best effort guard section comprises a physical layer and/or a link layer guard section having a size corresponding to a fragment size of a data fragment of packets transmitted in the unpartitioned best effort section.

This also increases the efficiency and performance of the network.

In a possible embodiment of the method according to the first aspect of the present disclosure, each time slot of the congestion protected section of the common periodic time window comprises an associated time slot guard section.

This embodiment has the benefit that inaccuracies in time synchronization are mitigated.

In a still further possible embodiment of the method according to the first aspect of the present disclosure, the packets being less sensitive or insensitive to delay variation are prioritized according to assigned transmission priorities.

In a still further possible embodiment of the method according to the first aspect of the present disclosure, a latency introduced by the used common periodic time window is deterministic and is automatically compensated to minimize a delay variation within the network.

In a still further possible embodiment of the method according to the first aspect of the present disclosure, the synchronization packet transmitted by a node of the network carries a time stamp generated by a time stamp generation unit of the respective node.

In a still further possible embodiment of the method according to the first aspect of the present disclosure, the duration of the common periodic time window and/or the duration of the time slots is preconfigured.

In a still further possible alternative embodiment of the method according to the first aspect of the present disclosure, the duration of the common periodic time window and/or the duration of the time slot is adjusted adaptively during operation of the network.

In a still further possible embodiment of the method according to the first aspect of the present disclosure, the network comprises at least one network segment having a time master node and at least one slave node.

In a still further possible embodiment of the method according to the first aspect of the present disclosure, the time master node and the slave node exchange synchronization packets with each other during time slots of the congestion protected synchronization section of the common periodic time window dedicated to the synchronization of the respective slave node.

In a still further possible embodiment of the method according to the first aspect of the present disclosure, the time master node of the network segment transmits unidirectionally synchronization packets to a slave node of the network segment during a downlink time slot of a congestion protected synchronization section of the common periodic time window dedicated to the synchronization of the respective slave node and the slave node of the network segment in turn transmits unidirectionally synchronization packets to the time master node of the network segment during uplink time slots of the congestion protected synchronization section of the common periodic time window dedicated to the synchronization of the respective slave node.

In a still further possible embodiment of the method according to the first aspect of the present disclosure, data packets and/or control packets are exchanged between slave nodes of a network segment of the network during at least one time slot of the congestion protected data section of the common periodic time window dedicated to a bidirectional communication channel between both slave nodes of the network.

In a still further possible embodiment of the method according to the first aspect of the present disclosure, a slave node of a network segment of the network transmits unidirectionally data packets and/or control packets to another slave node of the same network segment of the network during a first time slot of the congestion protected data section of the common periodic time window dedicated to a bidirectional communication channel between both slave nodes of the network segment and wherein the other slave node of the network segment transmits unidirectionally data packets and/or control packets to the respective slave node during a second time slot of the congestion protected data section of the common periodic time window dedicated to the bidirectional communication channel between both slave nodes of the network segment of the network.

In a still further possible embodiment of the method according to the first aspect of the present disclosure, packets exchanged between slave nodes of a network segment of the network are transmitted hop to hop via signal lines and network switches of the network, wherein an additional latency introduced by the signal lines and the network switches is minimized by shifting the time slots dedicated to the respective packets within the common periodic time window from hop to hop to compensate the additional latency.

In a still further possible embodiment of the method according to the first aspect of the present disclosure, a start-up phase is provided wherein in a first step of the start-up phase any traffic except synchronization traffic is blocked and the synchronization traffic comprising synchronization packets is handled in a best effort manner, wherein in a second step of the start-up phase a common periodic time window having a congestion protected section partitioned into time slots for synchronization traffic and having a time slot guard section is set up, and wherein in a third step of the start-up phase a normal operation with a scheduled transmission of packets within the common periodic time window is initiated.

In a further possible embodiment of the method according to the first aspect of the present disclosure, a start-up phase is provided as described above but the second step of the start-up phase is omitted.

In yet another possible embodiment of the method according to the first aspect of the present disclosure having a start-up phase, the second step of the start-up phase may be divided or partitioned into sub-steps whereby the length of the time-slot guard section is decreased from sub-step to sub-step in dependency on the synchronization accuracy.

The disclosure herein further provides according to a further aspect a network comprising nodes each being adapted or configured to perform a scheduling method according to the first aspect of the present disclosure.

In a possible embodiment of the network according to the second aspect of the present disclosure, the network comprises an access network.

In a still further possible embodiment of the network according to the second aspect of the present disclosure, the network comprises a fronthaul network.

In a still further possible embodiment of the network according to the second aspect of the present disclosure, the network comprises a midhaul network.

In a still further possible embodiment of the network according to the second aspect of the present disclosure, the network comprises a backhaul network.

In a still further possible embodiment of the network according to the second aspect of the present disclosure, the network comprises a 5G mobile communication network.

In a possible embodiment of the network according to the second aspect of the present disclosure, the network is a time-triggered network comprising one or several network segments each comprising a time master node and slave nodes synchronized to each other by a packet-based synchronization mechanism.

In a possible embodiment of the network according to the second aspect of the present disclosure, the slave node of the network segment comprises a radio remote head, RRH.

In a still further possible embodiment of the network according to the second aspect of the present disclosure, the slave nodes of the network segment comprise baseband units, BBU.

The disclosure herein further provides according to a further aspect a node of a network, the node comprising ports each adapted or configured to perform a scheduling method according to the first aspect of the present disclosure.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
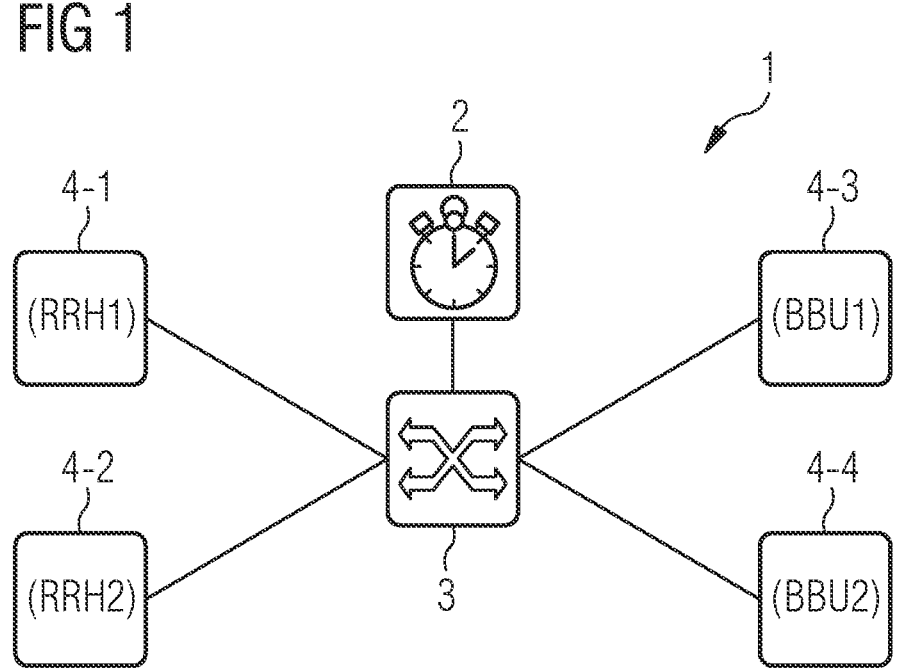
FIG. 1 illustrates a smaller exemplary network wherein the scheduling method according to the present disclosure can be employed.

As can be seen in the diagram illustrated in FIG. 1, a network 1 where the scheduling method according to the first aspect of the present disclosure can be employed can comprise several network nodes. FIG. 1 shows the topology of a small exemplary network 1 where a scheduling method according to the first aspect of the present disclosure can be used. In the illustrated exemplary network 1, the network comprises a single network segment comprising a master node 2 which can be formed by a time master node responsible for the timing within the single network segment of the packet switch network 1. In a further possible embodiment, the network 1 can comprise several network segments each having an associated master node 2. The master node 2 is adapted or configured to provide synchronization of the nodes within the respective network segment of the network 1. The network 1 further comprises in the illustrated exemplary embodiment a network switch 3 forming also a network node of the network segment of the network 1. Further, different kinds of slave nodes can be connected to ports of the switch 3. The switch 3 can comprise a predetermined number of different ports. These ports can comprise ingress ports as well as egress ports.

In the illustrated exemplary implementation of the network 1, the network nodes comprise four slave nodes 4-1, 4-2, 4-3, 4-4 connected to ports of the switch 3. In the illustrated embodiment, the first and the second slave node 4-1, 4-2 are formed by remote radio heads RRH1, RRH2 connected to ingress ports of the switch 3. The remaining nodes 4-3, 4-4 are formed in the illustrated embodiment by baseband units BBU1, BBU2 connected to egress ports of the switch 3. In a possible implementation, the master node 2 can comprise an IEEE 1588 master node. The network 1 as illustrated in FIG. 1 forms a time-triggered network where each endpoint and switch shares a same notion of time. The exemplary network 1 illustrated in FIG. 1 can employ a scheduling method according to the first aspect of the present disclosure. The employed scheduling method uses a common periodic time window CPTW having a congestion protected section CPS partitioned into time slots including time slots dedicated to packets being sensitive to delay variation. The packets sensitive to delay variation comprise in a possible embodiment synchronization packets or synchronization messages. The common periodic time window CPTW is partitioned into time slots. Parts of these time slots are allocated for the synchronization traffic for providing a packet-based synchronization mechanism between the time master node 2 and any device within the network segment to be synchronized, in particular the slave nodes 4-$i$. The other time slots of the common periodic time window CPTW can contain user data and/or control data. The scheduling method employing a partitioned time slot scheme results in that the synchronization packets do not suffer any congestions since specific time slots are exclusively reserved and allocated for the synchronization packets. Since there is almost no congestion for the synchronization packets any packet delay variation caused by queuing is avoided.

In a preferred embodiment, the time slots dedicated to packets being sensitive to delay variation are time slots dedicated to synchronization packets or synchronization messages. In other embodiments and in other use cases, the time slots dedicated to packets being sensitive to delay variations may comprise time slots for other kinds of sensitive packets for instance Voice over IP packets or any other packets being highly sensitive to delay variation.

Figure 2:
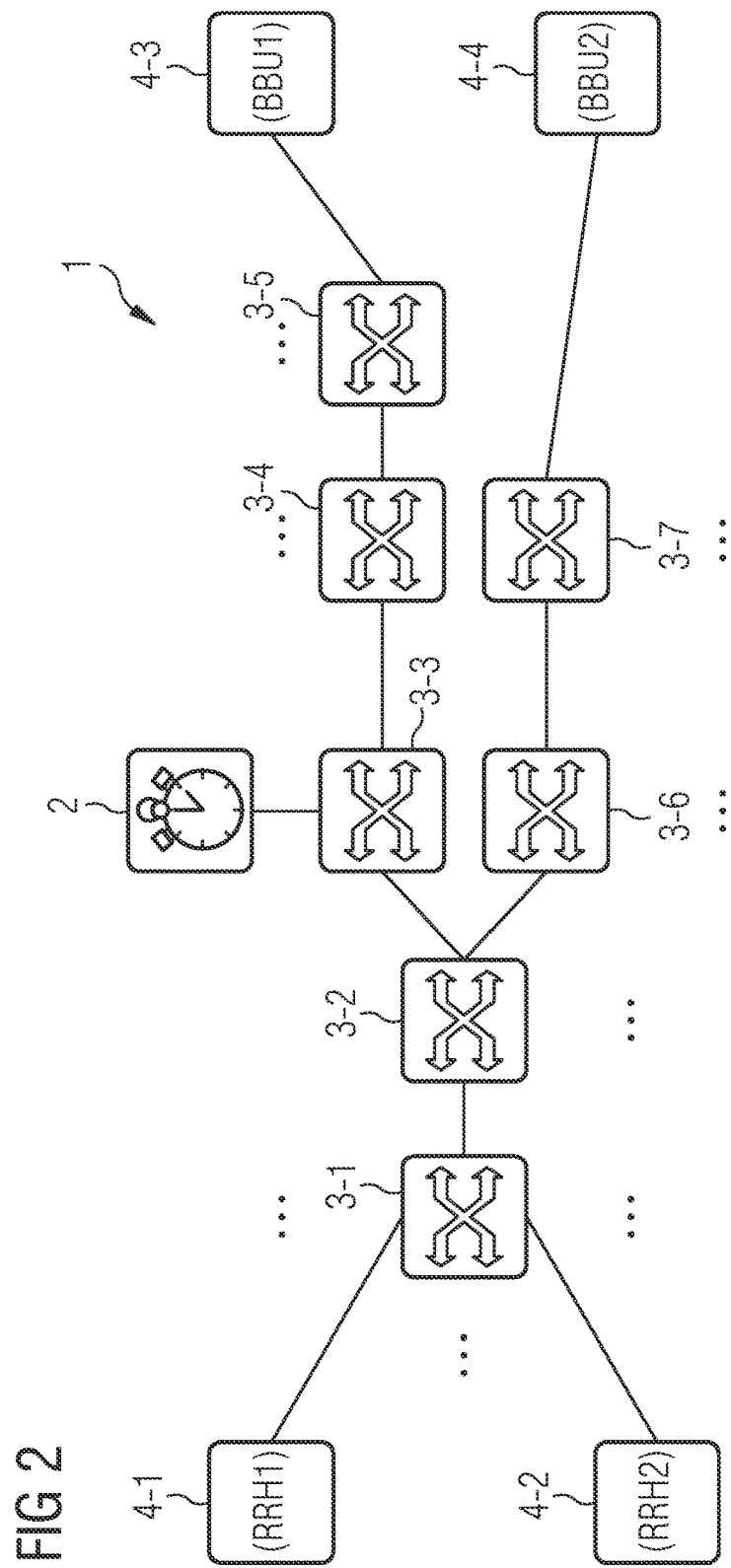
FIG. 2 shows a further possible exemplary larger network wherein the scheduling method according to the first aspect of the present disclosure can be employed.

The scheduling method can be used for a small network 1 as illustrated in FIG. 1 but also for more complex or larger networks as illustrated in FIG. 2 having for instance a higher number of network switches 3-$i$. In the illustrated embodiment of FIG. 2, the network 1 comprises seven switches 3-1 to 3-7. The first remote radio head 4-1 forming a slave node of the network segment transmits data packets via network switches 3-1, 3-2, 3-3, 3-4, 3-5 to the first baseband unit 4-3 forming another a slave node of the network segment. The other remote radio head 4-2 transmits data packets via the network switches 3-1, 3-2, 3-6, 3-7 to the second baseband unit 4-4 of the network. The switches 3-$i$ of the networks as illustrated in FIGS. 1, 2 form a shared medium or a shared resource which can cause a congestion of packets, in particular of time-sensitive synchronization packets. By using the scheduling method according to the first aspect of the present disclosure, a time delay variation TDV of the delay variation sensitive packets can be minimized. The scheduling method allows the integration and legacy compatibility of common public radio interface CPRI and Ethernet-based access networks. The time synchronization requirements for integrating CPRI are challenging. For common public radio interface CPRI, the time requirements can be different for different classes. For instance, for class A+ (MIMO, TX diversity), a timing error of less than 10 ns is required. For class A (contiguous carrier aggregation intra band), the timing error must be less than 45 ns. For class B (non-contiguous carrier aggregation intra band/non-contiguous carrier aggregation inter band), the timing error has to be less than 110 ns. Finally, for class C (LTE), the timing error has to less than 1.36 µs. In a possible embodiment, the scheduling method according to the first aspect of the present disclosure as employed by the exemplary networks 1 illustrated in FIGS. 1, 2, fulfils the time synchronization requirements for any class specified by CPRI.

As illustrated in FIGS. 1, 2, the slave nodes which are synchronized by the master node 2 can communicate with each other by exchanging data and/or control packets via at least one switch 3 of the network segment. In the illustrated embodiment of the network, for instance a first remote radio head slave node 4-1 can transmit data packets via one or several network switches to an associated baseband unit BBU 4-1 through a first signal path. For instance, a data packet transmitted by the remote radio head 1 (slave node 4-1) arrives at an ingress port of the first switch 3-1 and is forwarded from an egress port of the first switch 3-1 via a signal line to an ingress port of the next switch 3-2. From there, the data packet travels through further ports along the switches 3-2, 3-3, 3-4, 3-5 until it reaches an ingress port of the associated baseband band unit node 4-3. All nodes of a network segment are synchronized to each other by the master timing node 2 of the network segment. For performing the synchronization, the master node 2 can exchange synchronization packets with any other node of the network segment. The master node 2 can exchange in the illustrated embodiment synchronization packets with any other node of the network segment including the remote radio head nodes 4-1, 4-2, the baseband unit nodes 4-3, 4-4 and any switch 3-$i$ of the network segment. In the illustrated example, the remote radio head nodes 4-1, 4-2 are slave nodes each having at least one egress port. The baseband unit nodes 4-3, 4-4 are slave nodes of the network segment each having an at least one ingress port. The switch nodes 3-$i$ of the network segment can form also slave nodes each having at least one ingress port and at least one egress port. In a preferred embodiment, each port of a node within the network segment is adapted or configured to perform the scheduling method according to the first aspect of the present disclosure. Accordingly, each port is adapted or configured to perform a scheduling of a transmission of packets within the network segment using a common periodic time window CPTW having a congestion protected section CPS partitioned into time slots including time slots dedicated to packets being sensitive to delay variations, in particular synchronization packets.

The common periodic time window CPTW is a global periodic time window known to each node within the network segment. In a possible embodiment, the common periodic time window CPTW is a predetermined common periodic time window wherein the duration of the time slots is preconfigured. In an alternative embodiment, the common periodic time window CPTW can be adjusted adaptively during operation of the network 1. The common periodic time window CPTW comprises at least one congestion protected section CPS. The congestion protected section CPS is partitioned into time slots including for each node of the network segment within the network downlink time slots and uplink time slots dedicated to packets being sensitive to delay variation, in particular time slots dedicated to synchronization packets used by the timing master node 2 for synchronizing the nodes of the network segment with each other. In a preferred embodiment, the congestion protected section CPS of the common periodic time window CPTW used in the network segment of the network 1 comprises a congestion protected synchronization section CPSS partitioned for each node of the network 1 into downlink and uplink time slots dedicated to transmit synchronization packets for time synchronization and/or for frequency synchronization of the nodes within the network segments.

In the embodiments illustrated in FIGS. 1, 2, the network 1 comprises a single network segment having a single timing master node 2. In alternative embodiments, the network 1 can comprise several network segments connected to each other by network bridge elements wherein each connected network segment comprises its associated master timing node 2 for performing synchronization, i.e. time synchronization and/or frequency synchronization of the nodes of the respective network segment.

The congestion protected section CPS of the common periodic time window CPTW used by the timing master node 2 of the respective network segment further comprises in a preferred embodiment a congestion protected data section CPDS partitioned into time slots wherein the time slots are dedicated to other packets being less sensitive or even insensitive to delay variation. These other packets can comprise for instance data packets and/or control packets exchanged between slave nodes of the network segment. In a still further possible embodiment of the employed scheduling method, the common periodic time window CPTW used within the respective network segment comprises the congestion protected section CPS, an unpartitioned best effort section BES and an unpartitioned best effort guard section BEGS. The unpartitioned best effort guard section BEGS can comprise a physical layer and/or a link layer guard section having a size which can correspond in a preferred embodiment to a fragment size of a data fragment of packets transmitted in the unpartitioned best effort section BES.

In a further possible embodiment of the scheduling method according to the first aspect of the present disclosure, each time slot of the congestion protected section CPS of the common periodic time window CPTW can comprise an associated time slot guard section.

The packets being less sensitive or even insensitive to delay variation such as data packets and/or control packets can be prioritized in a possible embodiment according to assigned transmission priorities.

The time latency introduced by the used common periodic time window CPTW is deterministic and can be automatically compensated to minimize the delay variation within the respective network segment of the network 1.

In a possible embodiment, each synchronization packet exchanged between network nodes of the network segment, in particular between the timing master node 2 and a slave node of the network segment can carry a time stamp which can be generated by a time stamp generation unit of the respective node. The time master node 2 of the network segment of the network 1 and a slave node of the same network segment can exchange synchronization packets with each other during time slots of the congestion protected synchronization section CPSS of the common periodic time window CPTW dedicated to the synchronization of the respective slave node. In a possible embodiment, the time master node 2 of the network segment transmits unidirectionally synchronization packets to a slave node of the network segment during a downlink time slot of the congestion protected synchronization section CPSS of the common periodic time window CPTW dedicated to the synchronization of the respective slave node. The slave node in turn transmits also unidirectionally synchronization packets back to the time master node 2 of the network segment during an uplink time slot of the congestion protected synchronization section CPSS of the common periodic time window CPTW of the network segment dedicated to the synchronization of the respective slave node. Further, data packets and/or control packets can be exchanged between slave nodes of the network segment of the network 1 during at least one time slot of the congestion protected data section CPDS of the common periodic time window CPTW dedicated to a bidirectional communication channel CC between two slave nodes such as a remote radio head, RRH, slave node and a baseband unit, BBU, slave node of the network segment. In a possible embodiment, a slave node of the network segment of the network 1 can transmit unidirectionally data packets and/or control packets to another slave node of the network segment during a predetermined first time slot of the congestion protected data section CPDS of the common periodic time window CPTW being dedicated to a bidirectional communication channel CC between both slave nodes of the network segment. Further, the other slave node of the pair of network nodes of the network segment can transmit unidirectionally data packets and/or control packets back to the respective other slave node of the slave node pair during a predetermined second time slot of the congestion protected data section CPDS of the common periodic time window CPTW dedicated to a bidirectional communication channel CC between both slave nodes of the node pair within the network segment. In a possible implementation, the node pair can be formed by a remote radio head node such as node 4-1 illustrated in FIGS. 1, 2 and an associated baseband unit node such as node 4-3 illustrated in FIGS. 1, 2. In a possible implementation, packets exchanged between slave nodes of a network segment are transmitted hop to hop via signal lines and network switches of the network segment. For instance, a packet transmitted by the remote radio head node 4-1 is transmitted via a signal line to a first switch 3-1 and then further hop to hop via further switches 3-2, 3-3, 3-4, 3-5 to the associated baseband unit node 4-3. The data packets can travel in a possible implementation via optical or electrical signal lines each introducing a tiny latency. Further, the processing of the packets within the switches can introduce further signal latency. In a possible implementation, the signal lines used for transmitting the data packets within the network segments are electrical signal lines. In an alternative embodiment, at least some of the signal lines used for transporting the packets within the network segment of the network 1 can comprise optical signal lines having optical fibers.

In a possible embodiment, an additional latency introduced by the signal lines of the network and by the network switches 3-i is minimized by shifting the time slots dedicated to the respective packets within the common periodic time window CPTW of the network segment from hop to hop to compensate the introduced additional latency. This allows to cover not only delay variation or latency variation but also to provide a lowest possible latency within the system. Additional delays introduced for instance by a cable length and switching delay per hop can be taken into account for the mechanism by managing the allocation of specific time slots for transmission of packets over multiple hops within a larger network as illustrated in FIG. 2. In this specific embodiment, a location of the time slots can be shifted or postponed slightly within the synchronized periodic time window from hop to hop to compensate for these additional delays. In a possible embodiment, an introduced cable delay can be determined by a mechanism similar to a ranging mechanism between an Optical Network Unit ONU and an Optical Line Terminal OLT in Gigabit Passive Optical Networks GPON. The switching delay is deterministic since congestion is avoided by the design of the network 1. It will be noted that in larger networks, time slots only have to be reserved for packets passing over a particular node (e.g. a switch). For example, a packet from node 4-1 to node 4-3 does not pass via switch 3-6 and switch 3-7. Therefore, no allocation of slots has to be made for the switch nodes (or ports of the switch nodes) 3-6 and 3-7 for this transaction.

In a possible embodiment of the scheduling method used by the network 1 as illustrated in FIGS. 1, 2, a start-up phase is provided when performing a start-up of the respective network segment. In a first step of the start-up phase, any traffic except synchronization traffic is blocked and the synchronization traffic within the network segment comprising exchanged synchronization packets is handled in a best effort manner. In a second step of the start-up phase, a common or global periodic time window CPTW having at least one congestion protected section CPS is set up for the network segment. The congestion protected section CPS is partitioned into time slots for the synchronization traffic and comprises a time slot guard section. In a final step of the start-up phase, a normal operation with a scheduled transmission of packets within the common periodic time window CPTW having been set up in the second step is initiated.

In another possible embodiment of the scheduling method used by the network 1 as illustrated in FIGS. 1 and 2, the start-up phase for the start-up of the respective network segment may omit or leave out the second step of the start-up phase in which a common or global periodic time window CPTW having at least one congestion protected section CPS is set up for the network segment.

In yet another possible embodiment of the scheduling method used by the network 1 as illustrated in FIGS. 1 and 2 and which includes a start-up phase, the second step of the start-up phase described above may be divided or portioned further into sub-steps whereby the length of the time-slot guard section is decreased from sub-step to sub-step in dependence on the synchronization accuracy.

The network 1 as illustrated in the exemplary embodiments shown in FIGS. 1, 2 is in a preferred embodiment a time-triggered network comprising one or several network segments each comprising a time master node 2 and further nodes synchronized to each other by a packet-based synchronization mechanism. The network 1 can comprise end nodes connected via network switches. The end nodes or endpoints can comprise for instance remote radio head, RRH, nodes and/or baseband unit, BBU, nodes. In a possible embodiment, the network 1 can comprise an access network, in particular an access network for a 5G mobile communication network. The network can also comprise a fronthaul network, a midhaul network and/or a backhaul network of a larger system. The scheduling method according to the first aspect of the present disclosure can be employed for any telecommunication system comprising a packet-based network segment.

Figure 3:
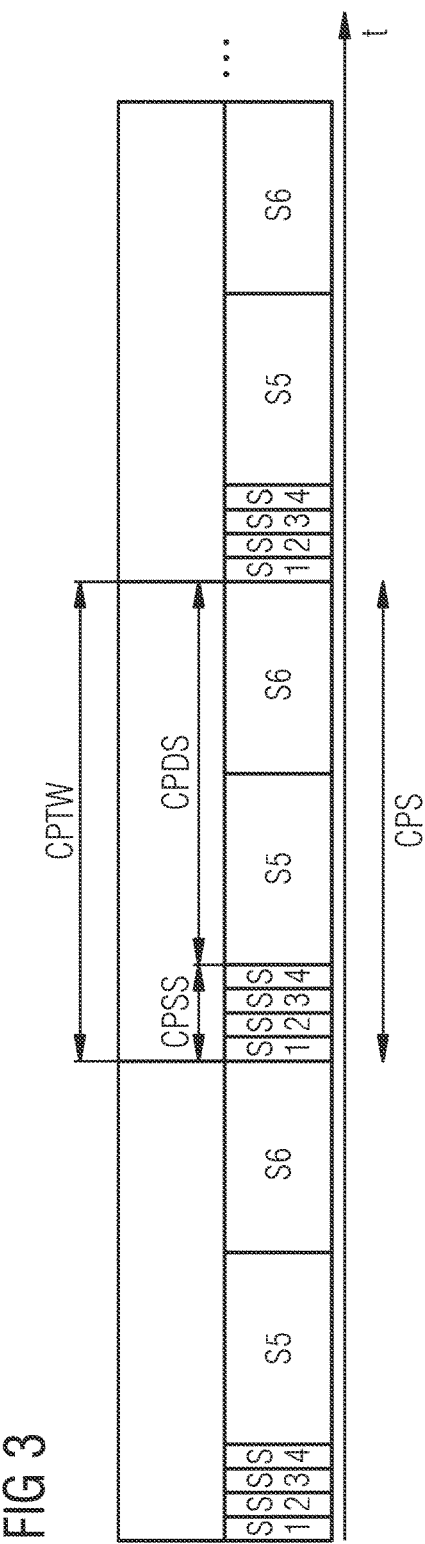
FIG. 3 shows a timing diagram for illustrating a possible exemplary embodiment for the scheduling method according to the present disclosure.

FIG. 3 shows a timing diagram to illustrate a possible exemplary embodiment of the scheduling method according to the first aspect of the present disclosure. In the illustrated embodiment, the common periodic time window CPTW used in the network segment consists of a congestion protected section CPS. The congestion protected section CPS of the common periodic time window CPTW is partitioned into time slots S including time slots S dedicated to packets being sensitive to delay variation and including time slots S being dedicated to packets being less sensitive to delay variation or even insensitive to delay variation. In the illustrated embodiment of FIG. 3, the congestion protected section CPS comprises a congestion protected synchronization section CPSS and a congestion protected data section CPDS. The congestion protected synchronization section CPSS is partitioned for each node of the network into time slots S dedicated to packets being sensitive to delay variation, in particular to time slots dedicated to transport synchronization packets. In a possible embodiment, the congestion protected synchronization section CPSS comprises for each endpoint node of the network segment a time slot S dedicated to exchange synchronization packets between the master node 2 of the network segment and the respective endpoint node forming a slave node of the network segment. For the small network segment illustrated in FIG. 1, the master node 2 may use dedicated time slots within the congestion protected synchronization section CPSS for performing a synchronization mechanism with the respective slave node. In the illustrated embodiment of FIG. 1, the network segment comprises four endpoint nodes 4-1, 4-2, 4-3, 4-4 connected with each other via a single switch element 3 of the network segment. As can be seen in FIG. 3, the common periodic time window CPTW comprises in the illustrated embodiment a single congestion protected synchronization section CPSS comprising four time slots S1, S2, S3, S4 dedicated for the transport of synchronization packets between the master timing node 2 and the respective endpoint nodes 4-i. In the illustrated exemplary implementation, the first time slot S1 is dedicated for synchronization packets used for synchronizing the first endpoint node 4-1 which may be formed by a remote radio head node. The second time slot S2 is dedicated for the transport of synchronization packets used for synchronizing the second endpoint node 4-2 of the network segment which can be formed by another remote radio head node. The third time slot S3 within the congestion protected synchronization section CPSS is used for the transport of synchronization packets used for synchronizing the third endpoint node 4-3 of the network segment which can be formed by a baseband unit BBU1. The fourth time slot S4 is dedicated to synchronization packets exchanged between the master timing node 2 and the fourth endpoint node 4-4 which can be formed by another baseband unit BBU2.

In a possible implementation, the length or duration of the synchronization time slots S1, S2, S3, S4 is equal. In an alternative implementation or use case, the time slots S dedicated to synchronization packets or specific nodes within the network segment can be different and can even be adaptive depending on the use case. For instance, the synchronization of a first type of slave nodes within the network segment can use another synchronization mechanism than used for synchronization of another type of network nodes within the network segment. For each different synchronization mechanism, the length of the time slots S dedicated for the transport of respective synchronization packets exchanged within the respective synchronization mechanism can be different and can be preconfigured accordingly.

In the illustrated embodiment of FIG. 3, the common periodic time window CPTW comprises a single congestion protected section CPS which includes the congestion protected synchronization section CPSS and a congestion protected data section CPDS. The congestion protected data section CPDS is also partitioned into time slots S dedicated to other packets being less sensitive or even insensitive to delay variation. These other packets may comprise data packets and/or control packets transported between end point nodes 4-i of the network segment of the network 1. In the illustrated implementation of FIG. 3, the time slot S5 is dedicated to transport data packets from node 4-1 to node 4-3, i.e. from the remote radio head node 4-1 to the associated baseband unit node 4-3. Further, the sixth time slot S5 of the common periodic time window CPTW is dedicated in the illustrated embodiment to data packets transported from the second endpoint node 4-3 to the fourth endpoint node 4-4, i.e. from the second remote radio head node 4-2 to the associated baseband unit node 4-4 as illustrated in FIG. 1. In the illustrated embodiment of FIG. 3, a time length of the time slots S5, S6 dedicated for transport of data and/or control packets comprise a higher length than the time slots S1 to S4 dedicated to transport synchronization packets. This is because synchronization packets used for synchronizing nodes with each other comprise normally a smaller length than data packets used for transporting data between nodes of the network segment. For instance, a synchronization packet may comprise a data length of 50 to 100 Byte whereas a data packet may comprise more than 1000 Byte. In a possible implementation, the length of the different time slots S dedicated to transmit data and/or control packets between endpoint nodes 4-$i$ of the network segment can comprise equal length as illustrated in the timing diagram of FIG. 3. In an alternative implementation, the length of the time slots dedicated to different signal paths between endpoint nodes 4-$i$ of the network segment can vary and be preconfigured according to the respective use case. In the illustrated embodiment of FIG. 3, the data packets are transmitted unidirectionally from a source node, i.e. a remote radio head node 4-1, to an associated destination node, i.e. baseband unit 4-3. In an alternative embodiment, the data packets and/or control packets can also be exchanged bidirectionally between two endpoint nodes 4-$i$ of the network segment within assigned time slots of the congestion protected data section CPDS.

In the illustrated embodiment of FIG. 3, the congestion protected synchronization section CPSS comprises four time slots S1 to S4 dedicated to transmit synchronization packets and the congestion protected data section CPDS comprises two time slots S5, S6 dedicated to the transmission of data packets. In an alternative embodiment, the time slots of the congestion protected synchronization section CPSS can also be interleaved with time slots of the congestion protected data section CPDS. For instance, time slot S5 dedicated for the transport of data packets from the first end node 4-1 to the third end node 4-3 can follow directly after synchronization time slots S1, S2 provided for the synchronization of the two endpoint nodes 4-1, 4-3.

Figure 4:
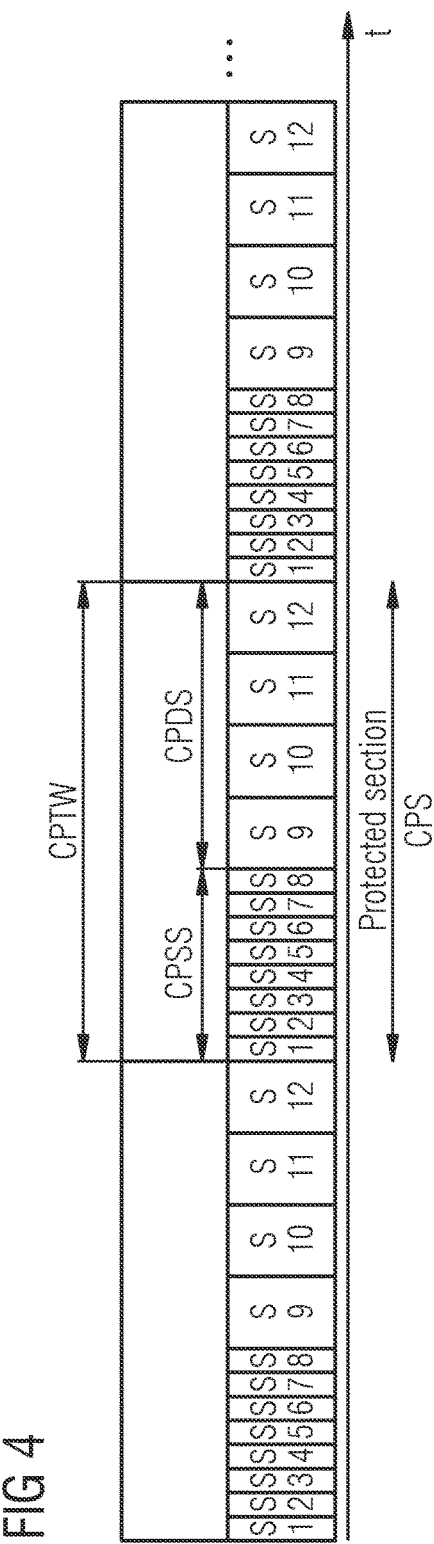
FIG. 4 shows a further timing diagram for illustrating a further possible exemplary embodiment of a scheduling method according to the first aspect of the present disclosure.

FIG. 4 shows a timing diagram of a further possible exemplary embodiment of the scheduling method according to the first aspect of the present disclosure. In the illustrated embodiment, the common periodic time window CPTW comprises a congestion protected synchronization section CPSS wherein the congestion protected section CPS comprises a congestion protected synchronization section CPSS and a congestion protection data section CPDS. The congestion protected synchronization section CPSS is partitioned for each node of the network into downlink and uplink time slots dedicated to transmit synchronization packets used for time and/or frequency synchronization of the nodes of the network segment. In the illustrated embodiment, also the congestion protected data section CPDS is partitioned for each node of the network 1 into downlink and uplink time slots dedicated to transmit data packets unidirectionally. In the illustrated implementation, the congestion protected synchronization section CPSS is partitioned for each endpoint node 4-$i$ of the network 1 illustrated in FIGS. 1, 2 into downlink and uplink time slots dedicated to transmit synchronization packets used for time and/or frequency synchronization of the respective nodes. In the illustrated implementation, the first time slot S1 is dedicated to transport exclusively only synchronization packets from the node to be synchronized 4-1, i.e. the remote radio head node RRH1 to the master clock node 2 of the network segment. The second time slot S2 is used exclusively for the transport of synchronization packets from the master time node 2 to the endpoint node 4-1. The third time slot S3 is used for the transport of synchronization packets from the endpoint node 4-3, i.e. from the baseband unit node BBU1 to the master node 2 of the network segment, whereas the fourth time slot S4 is used for the transport of the synchronization packets in the other direction, i.e. from the master node 2 to the endpoint node 4-3. In the same manner, the downlink and uplink time slots S5, S6 can be used for transport of synchronization packets between the master node 2 and the endpoint node 4-2. The time slots S7, S8 form downlink and uplink time slots which are used for the exchange of synchronization packets or synchronization messages between the master node 2 and the fourth endpoint node 4-4 of the network segment, i.e. the second baseband unit node BBU2.

The congestion protected data section CPDS comprises in the implementation shown in FIG. 4 four time slots S9, S10, S11, S12. In a possible embodiment, the first time slot S9 of the congestion protected data section CPDS is used for the transport of data packets from an endpoint node 4-1 to another endpoint node 4-3, for instance from a first remote radio head node RRH1 to its associated baseband unit node BBU1. The second time slot S10 of the congestion protected data section CPDS is reserved exclusively for the transport of data packets in the other direction, i.e. from the endpoint node 4-3 to the associated first endpoint node 4-1. The third time slot S11 of the congestion protected data section CPDS is reserved for the transport of data packets from the remote radio head node 4-2 to the associated baseband unit node 4-4. The fourth time slot S12 of the congestion protected data section CPDS is used for transport of data and/or control packets from the baseband unit node 4-4 to the remote radio head node 4-2 in the illustrated implementation. The embodiment illustrated in FIG. 4 provides a finer control and can increase the efficiency and performance of the network 1. It provides a time-triggered periodic window with finer granularity for the transport of synchronization and/or data packets in opposing directions between endpoint nodes 4 of the network segment.

The illustrated implementation of FIG. 4 provides unidirectional uplink and downlink time slots for synchronization packets and/or data packets. In a further possible implementation, uplink and downlink time slots may be only used for the transport of synchronization packets whereas the time slots for the transport of packets between two nodes are not divided into uplink and downlink time slots similar to the embodiment illustrated in FIG. 3. Further, in a possible implementation, the uplink and downlink time slots used for synchronization packets and the uplink and/or downlink time slots used for data or control packets can be interleaved with each other. For instance, the first and second time slot S1, S2 used for the synchronization packets of the first endpoint node 4-1 and the synchronization time slots S3, S4 used for the synchronization of the associated endpoint node 4-3 may be followed directly by the time slots S9, S10 used for the data transport between both nodes.

Other interleaving schemes than the implementation depicted in FIG. 4 are also possible. For example, the synchronization slots may be nested or interleaved. A synchronization uplink time slot for node 4-1 to node 2 may be followed by another synchronization uplink time slot for node 4-3 to node 2 (e.g. S1 and S2). Then the downlink synchronization slot for node 2 to node 4-1 follows (S3) and thereafter the downlink synchronization slot for node 2 to node 4-3 (S4) follows. Another example is the nesting of synchronization time-slots with data time-slots. After the uplink sync time-slot for node 4-2 to node 2 (S5), a data time-slot for node 4-1 to node 4-3 is inserted (S6). The downlink synchronization time-slot for node 2 to node 4-2 then follows (S7). Both examples allow the efficiency and network utilization to be increased further. The nesting and interleaving avoids the non-active wait time for the network while the receiving node (e.g. node 2) processes the request and prepares a response. The nesting and interleaving of the short synchronization time-slots is especially beneficial. However, if the processing time is longer, an interleaving or nesting of synchronization time-slots with longer data time is also advantageous.

Figure 5:
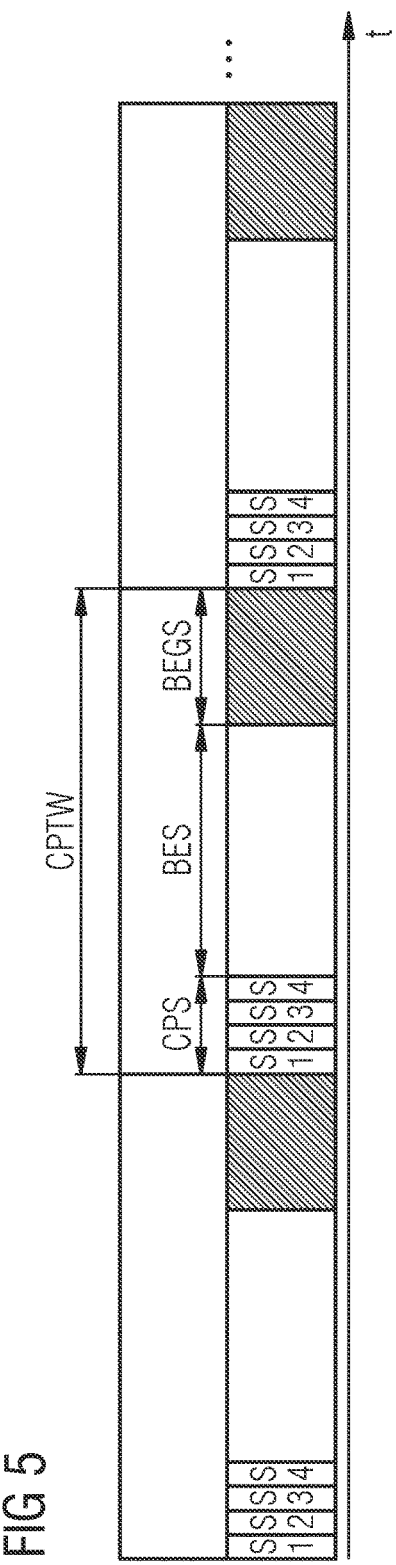
FIG. 5 shows a further timing diagram for illustrating a further possible exemplary embodiment of a scheduling method according to the first aspect of the present disclosure.

FIG. 5 shows a further possible exemplary embodiment of a scheduling method according to the present disclosure. In the illustrated embodiment of FIG. 5, the common periodic time window CPTW comprises a congestion protected section CPS, an unpartitioned best effort section BES and an unpartitioned best effort guard section BEGS. The congestion protected section CPS is used in the illustrated embodiment for traffic required by the packet-based synchronization mechanism, for instance by the packet-based synchronization mechanism according to IEEE 1588. The best effort section BES forms a data transport section containing the actual user traffic and control traffic. The best effort guard section BEGS contains no traffic but ensures that no data packet is sent that cannot be fit into the common periodic time window CPTW and would reach the congestion protected section CPS of the next common periodic time window CPTW thus causing a delay and delay variation of the corresponding synchronization packets.

The congestion protected section CPS is partitioned into time slots which are allocated for the synchronization traffic between the timing master node 2 and the devices to be synchronized within the network segment. The best effort section BES forming the data section is not partitioned into time slots. The best effort section BES is covering a best effort data traffic or a priority-based schedule traffic (for example comprising VLAN tags or VLAN priority policing). The implementation illustrated in FIG. 5 has the advantage of providing an almost zero congestion of the synchronization packets with minimal delay for the synchronization but also provides a high efficiency and performance of the network segment for priority-based packet transmission.

Figure 6:
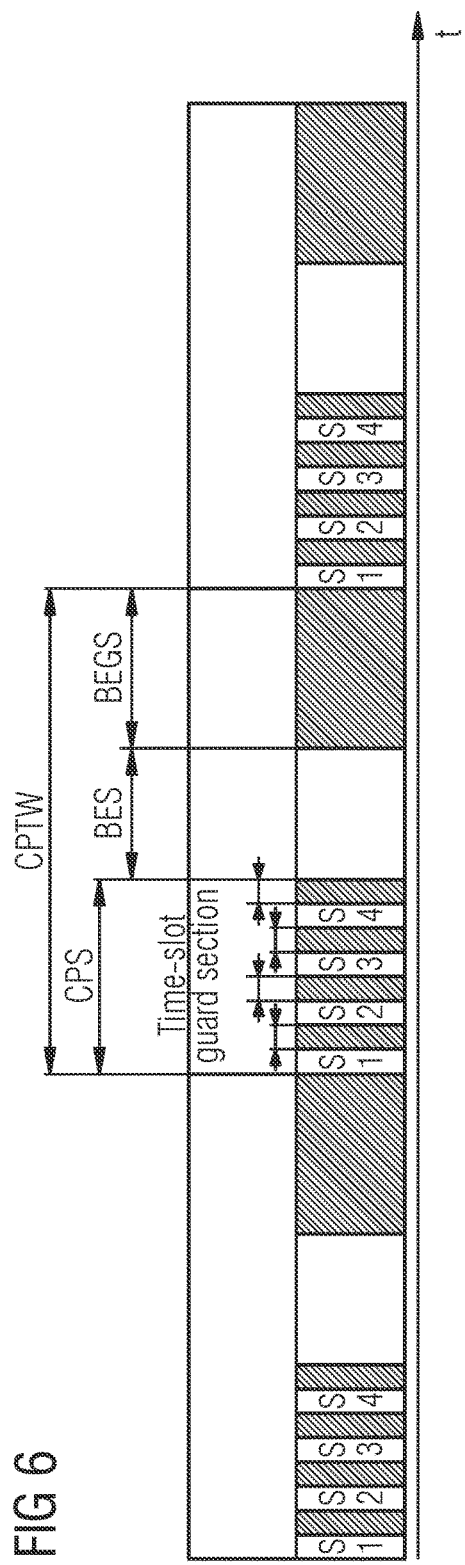
FIG. 6 shows a further timing diagram for illustrating a further possible exemplary of a scheduling method according to the first aspect of the present disclosure.

FIG. 6 shows a timing diagram of a possible further exemplary embodiment of the scheduling method according to the first aspect of the present disclosure. In the illustrated embodiment, each time slot S of the congestion protected section CPS of the common periodic time window CPTW comprises an associated time slot guard section. This provides the benefit that inaccuracies in the time synchronization can be mitigated. In the illustrated embodiment, the congestion protected section CPS comprises four time slots S1, S2, S3, S4 used for synchronizing the endpoint nodes 4-1 to 4-4 of the exemplary network 1 shown in FIGS. 1, 2. Each time slot S1, S2, S3, S4 of the congestion protected section CPS comprises an associated time slot guard section as illustrated in the timing diagram of FIG. 6. The variant illustrated in FIG. 6 extends the previous shown variants by inserting small time slot guard sections in the protected section between the time slots S1, S2, S3, S4 and by extending slightly the best effort guard section BEGS.

Figure 7:
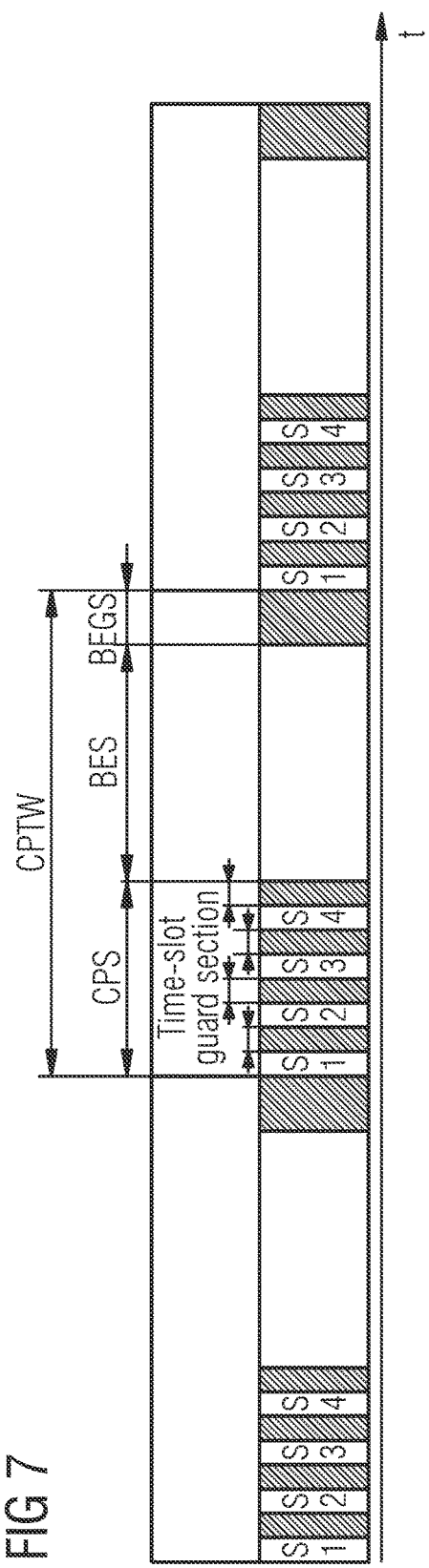
FIG. 7 shows a further timing diagram for illustrating a further possible exemplary embodiment of a scheduling method according to the first aspect of the present disclosure.

FIG. 7 shows a timing diagram for illustrating a further possible exemplary embodiment of the scheduling method according to the first aspect of the present disclosure. The embodiment uses a time-triggered periodic window CPTW with best effort section BES and a reduced best effort guard section BEGS. In a possible embodiment, the variant illustrated in FIG. 7 extends the previous variants by applying a frame pre-emption technique to shrink the size of the best effort guard section BEGS. In the embodiment illustrated in FIG. 7, the best effort guard section BEGS can comprise a physical layer and/or a link layer guard section having a size corresponding to a fragment size of a data fragment of packets transmitted in the unpartitioned best effort section BES. For instance, a data packet transported in the best effort section BES can comprise eight data fragments each comprising 64 Byte. In this exemplary implementation, the best effort guard section BEGS comprises a size corresponding to the fragment size of the data fragment, i.e. 64 Byte. The illustrated embodiment further increases the efficiency and performance of the transmission system by shrinking the dead time of the guard section.

In an alternative embodiment to FIG. 7, fragments of the packet are sent out as long as they fit into the best-effort guard band. If a fragment does not fit into the best-effort guard section, it is pre-empted so that it cannot violate the periodic window and the congestion protected section. By over-running the best-effort guard section as long as possible, this example increases the transmission efficiency by decreasing the dead-time of the network where no traffic is allowed to flow.

Figure 8:
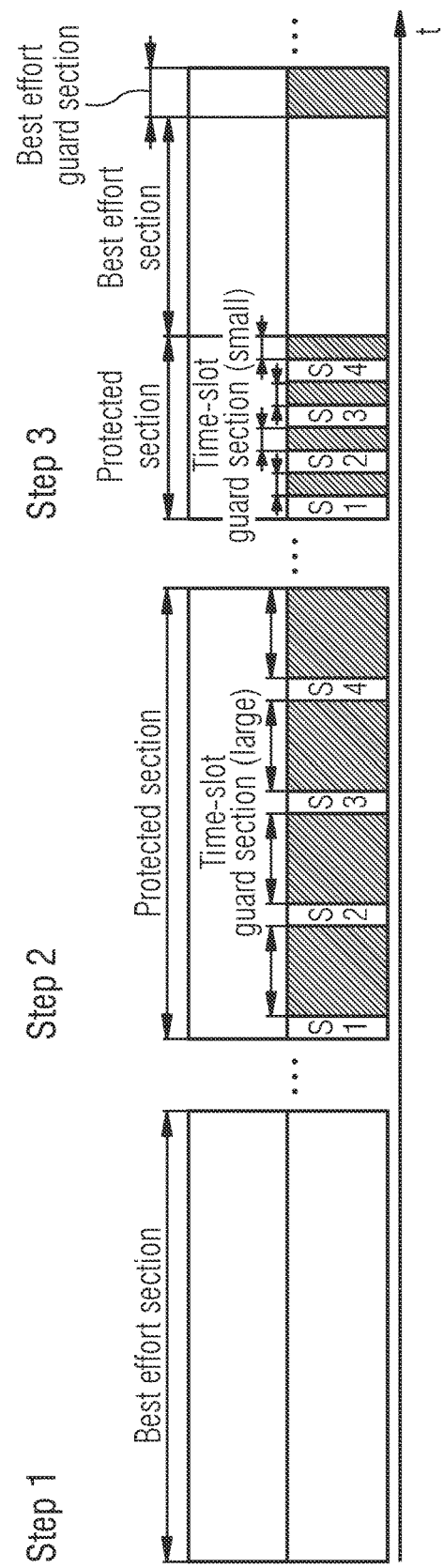
FIG. 8 shows a further timing diagram for illustrating a further possible exemplary embodiment of a scheduling method according to the first aspect of the present disclosure.

FIG. 8 shows a timing diagram for illustrating a further possible exemplary embodiment of the scheduling method according to the first aspect of the present disclosure. In the illustrated variant of FIG. 8, the previous variants of the scheduling method are extended by a method and system for bringing up or starting up the system in a start-up phase comprising several substeps. In a first step 1 as illustrated in FIG. 8 of the start-up phase, any traffic except synchronization traffic is blocked and the synchronization traffic comprising synchronization packets is handled in a best effort manner. A possible approach to accomplish this can be traffic filtering and gating similar to IEEE 802.1Qci. The synchronization packets are distributed by best effort handling. This can lead to congestions in the network which influences the accuracy of the packet-based time synchronization. During the start-up phase, this is taken into account in step 2 by setting up a periodic window scheduling, i.e. a common or global periodic time window CPTW within the network segments having a protected section that includes a large time slot guard section as illustrated in FIG. 8. As in the previous step 1, only synchronization traffic is admitted in the second step 2 of the start-up phase. Depending on the targeted synchronization accuracy, the step 2 can be partitioned further into multiple substeps where the length of the time slot guard section is decreased from substep to substep. Finally, in a third step 3 of the start-up phase, a normal operation with a scheduled transmission of packets within the common periodic time window CPTW is initiated as shown in FIG. 8. Accordingly, a switchover to a normal operation mode is performed. This normal operation mode of the scheduling method according to the first aspect of the present disclosure is performed, i.e. the set-up common periodic time window CPTW comprises a congestion protected section CPS which is partitioned into time slots including time slots S dedicated to packets being sensitive to delay variation, in particular to synchronization packets.

Figure 9:
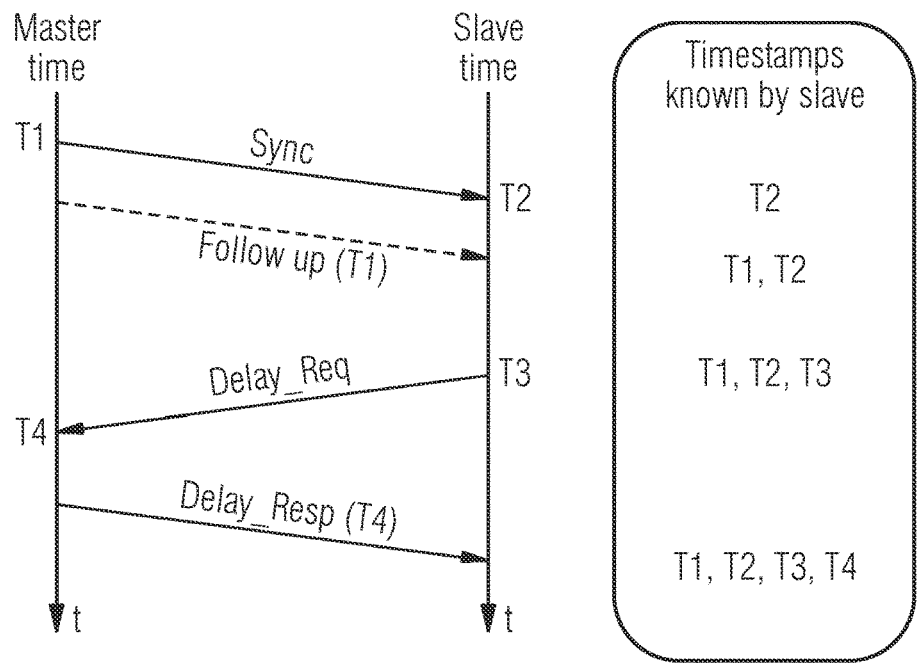
FIG. 9 shows a further diagram for illustrating a possible exemplary implementation of a time synchronization mechanism using a scheduling method according to the first aspect of the present disclosure.

FIG. 9 shows a timing diagram for illustrating a possible exemplary embodiment for performing a time synchronization between nodes in a network segment. In a possible embodiment of the scheduling method according to the first aspect of the present disclosure, each network segment comprises a time master node 2 having a master time and slave nodes 3, 4 each having a slave time synchronized to each other by a packet-based synchronization mechanism. In a possible embodiment, the synchronization packets transmitted to a node 3, 4 of the network segment can carry a time stamp T which may be generated by a time stamp generation unit of the respective node. In the illustrated exemplary implementation shown in FIG. 9, the master node 2 comprising the master time transmits a synchronization packet to a slave node. In the illustrated example, the first synchronization packet does not carry a time stamp. In an alternative embodiment, the first synchronization packet can already comprise a time stamp T. In the example shown in FIG. 9, the time stamps T known to the slave node are also illustrated. After having received a follow-up synchronization message from the master node 2, the slave node is aware of the time stamps T1, T2. After having sent a delay request message at time T3 to the master node 2, the master node 2 may send a delay response message carrying a time stamp T4 back to the slave node. Finally, the slave node knows four time stamps T1, T2, T3, T4 as illustrated in FIG. 9. In a possible implementation, the slave node can calculate a mean path delay as follows:

$$MPD = \frac{(T2-T1)+(T4-T3)}{2}$$

wherein MPD is the mean path delay. The slave node can adjust its internal clock according to the calculated mean path delay.

Figure 10:
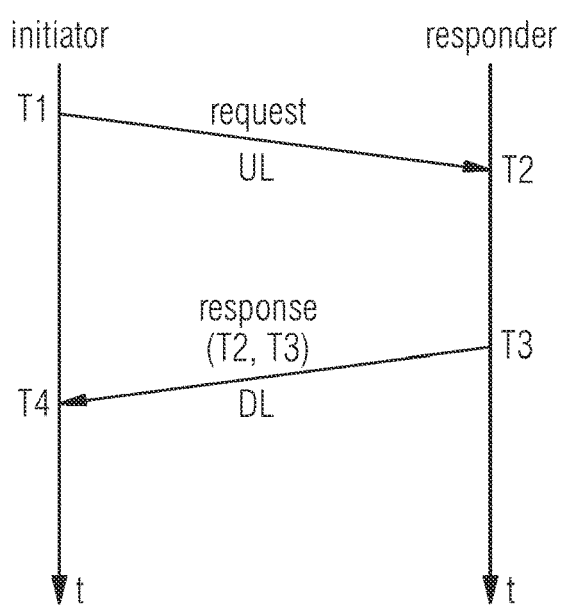
FIG. 10 shows a further diagram for illustrating a possible implementation for performing time synchronization using a scheduling method according to the first aspect of the present disclosure.

FIG. 10 shows a further alternative implementation of a time synchronization mechanism which may be used for synchronizing nodes using the time scheduling method according to the first aspect of the present disclosure. An initiator such as the slave node 3 sends in the illustrated implementation a request message to a responder which can be formed by the master node. The request message is transmitted at time t1. The responder provides a time stamp when the message is received by the responder, i.e. time stamp T2. Then a response message is transmitted from the responder in opposite direction to the initiator. The response message carries the time stamp T2 and the time stamp T3 when the response message is sent back to the initiator. Further, the initiator provides a time stamp T4 upon receipt of the response message from the responder. The mean path delay MPD can then be calculated as follows:

$$MPD = \frac{(T2-T1)+(T4-T3)}{2}$$

Accordingly, a propagation delay is measured with the help of timestamping. Then, the node can correct the time offset. In the method and system according to the present disclosure, a globally synchronized and known periodic time window CPTW can comprise a congestion protected section CPS as a whole which is partitioned further in time slots S where dedicated time slots are allocated to packet delay variation sensitive data and dedicated time slots which are used for less or non-packet delay variation sensitive data. The scheduling method can be used in different kinds of networks, in particular in access networks of 5G mobile communication systems. Further, the scheduling method can be implemented in fronthaul networks, midhaul networks and/or backhaul networks.

The disclosure herein further provides according to a third aspect a network node of a network wherein the node comprises ports each adapted or configured to perform a scheduling method according to the first aspect of the present disclosure. The port is in a preferred embodiment an egress port of a network device or network element such as an endpoint node and/or a switch node or switching element of a network segment.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 1 network
2 master node
3 switch
4 endpoint node

The invention claimed is:

1. A method for scheduling a transmission of packets within a network the method comprising:
using a common periodic time window, having a congestion protected section, partitioned into time slots, including time slots dedicated to packets being sensitive to a delay variation, wherein a latency introduced by the used common periodic time window, is deterministic and is automatically compensated to minimize a delay variation within the network.

2. The method according to claim 1 wherein the congestion protected section is partitioned into time slots, including for each node of the network downlink time slots and uplink time slots dedicated to packets being sensitive to a delay variation.

3. The method according to claim 1 wherein the congestion protected section, of the common periodic time window, comprises a congestion protected synchronization section, partitioned for each node of the network into downlink and uplink time slots dedicated to transmit synchronization packets used for time and/or frequency synchronization of the nodes.

4. The method according to claim 3 wherein the synchronization packet transmitted by a node of the network carries a time stamp generated by a time stamp generation unit of the respective node.

5. The method according to claim 1 wherein the congestion protected section, of the common periodic time window, further comprises a congestion protected data section, partitioned into time slots, dedicated to other packets being less sensitive or insensitive to delay variation, the other packets comprising data packets and/or control packets.

6. The method according to claim 5 wherein the packets being less sensitive or insensitive to delay variation are prioritized according to assigned transmission priorities.

7. The method according to claim 5 wherein the data packets and/or control packets are exchanged between slave nodes of a network segment of the network during at least one time slot of the congestion protected data section, of the common periodic time window, dedicated to a bidirectional communication channel between both slave nodes.

8. The method according to claim 7 wherein a slave node of a network segment transmits unidirectionally data packets and/or control packets to another slave node of the network segment during a first time slot of the congestion protected data section, of the common periodic time window, dedicated to a bidirectional communication channel, between both slave nodes of the network segment and wherein the other slave node of the network segment transmits unidirectionally data packets and/or control packets to the respective slave node during a second time slot of the congestion protected data section, of the common periodic time window, dedicated to the bidirectional communication channel, between both slave nodes of the network segment.

9. The method according to claim 8 wherein packets exchanged between slave nodes of a network segment are transmitted hop to hop via signal lines and network switches of the network,
wherein an additional latency introduced by the signal lines and the network switches is minimized by shifting the time slots dedicated to the respective packets within the common periodic time window, from hop to hop to compensate the additional latency.

10. The method according to claim 1 wherein the common periodic time window comprises the congestion protected section,
an unpartitioned best effort section, and
an unpartitioned best effort guard section.

11. The method according to claim 10 wherein the unpartitioned best effort guard section, comprises a physical layer and/or a link layer guard section having a size corresponding to a fragment size of a data fragment of packets transmitted in the unpartitioned best effort section.

12. The method according to claim 1 wherein each time slot, of the congestion protected section, of the common periodic time window, comprises an associated time slot guard section.

13. The method according to claim 1 wherein a duration of the common periodic time window, and/or a duration of the time slots, is preconfigured or adjusted adaptively during operation of the network.

14. The method according to claim 1 wherein the network comprises at least one network segment having a time master node and at least one slave node,
wherein the time master node and the slave node exchange synchronization packets with each other during time slots, of the congestion protected synchronization section, of the common periodic time window, dedicated to synchronization of the respective slave node.

15. The method according to claim 14 wherein the time master node of the network segment transmits unidirectionally synchronization packets to a slave node of the network segment during a downlink time slot of a congestion protected synchronization section, of the common periodic time window, dedicated to the synchronization of the respective slave node, and
wherein a slave node of the network segment transmits unidirectionally synchronization packets to the time master node of the network segment during an uplink time slot of the congestion protected synchronization section, of the common periodic time window, dedicated to the synchronization of the respective slave node.

16. The method according to claim 1 comprising a start-up phase,
wherein in a first step of the start-up phase any traffic except synchronization traffic is blocked and the synchronization traffic comprising synchronization packets is handled in a best effort manner,
wherein in a second step of the start-up phase a common periodic time window, having a congestion protected section, partitioned into time slots, for synchronization traffic and having a time slot guard section is set up, and
wherein in a third step of the start-up phase a normal operation with a scheduled transmission of packets within the common periodic time window, is initiated.

17. The method according to claim 16,
wherein the second step of the start-up phase is partitioned further into sub-steps whereby a length of the time-slot guard section is decreased from sub-step to sub-step in dependency on the synchronization accuracy.

18. The method according to claim 1 comprising a start-up phase,
wherein in a first step of the start-up phase any traffic except synchronization traffic is blocked and the synchronization traffic comprising synchronization packets is handled in a best effort manner, and
wherein in a further step of the start-up phase a normal operation with a scheduled transmission of packets within a common periodic time window, is initiated.

19. A network comprising nodes that are each configured to perform a scheduling method for scheduling a transmission of packets within the network using a common periodic time window, having a congestion protected section, partitioned into time slots, including time slots dedicated to packets being sensitive to a delay variation, wherein the network comprises:
an access network;
a fronthaul network;
a midhaul network;
a backhaul network; and/or
a 5G mobile communication network, wherein the nodes are further configured to automatically compensate a latency introduced by the used common periodic time window, which is deterministic, to minimize a delay variation within the network.

20. The network according to claim 19 wherein the network is a time-triggered network comprising one or several network segments each comprising a time master node and slave nodes synchronized to each other by a packet-based synchronization mechanism, wherein the slave node comprises a radio remote head, or a baseband unit.

21. A node of a network, the node comprising ports that are each configured to perform a scheduling method, for scheduling a transmission of packets within the network using a common periodic time window, having a congestion protected section, partitioned into time slots, including time slots dedicated to packets being sensitive to a delay variation, wherein the network comprises an access network, wherein the node is further configured to automatically compensate a latency introduced by the used common periodic time window, which is deterministic, to minimize a delay variation within the network.

* * * * *